Feb. 25, 1930.  H. F. MONTAGUE  1,748,183
TOY VEHICLE
Filed March 5, 1926
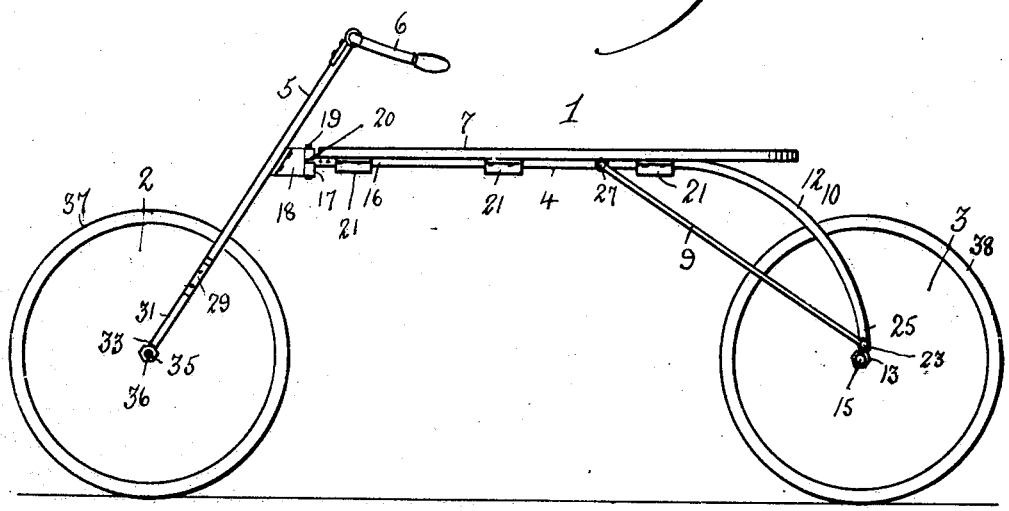
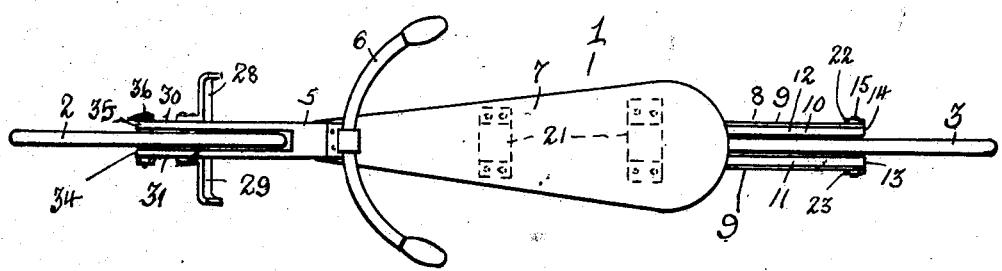
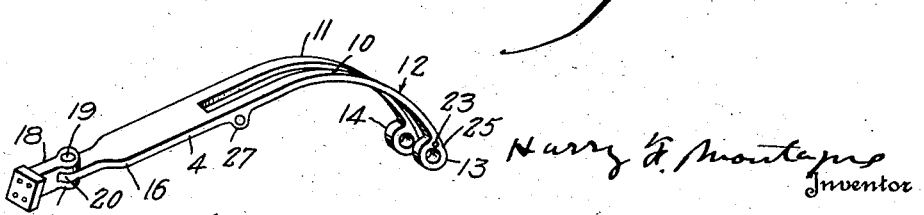

Patented Feb. 25, 1930

1,748,183

UNITED STATES PATENT OFFICE

HARRY F. MONTAGUE, OF MINNEWAUKAN, NORTH DAKOTA

TOY VEHICLE

Application filed March 5, 1926. Serial No. 92,532.

This invention relates to improvements in toy vehicles, and has for its object to provide a combination between a bicycle and a coaster car.

Another object of the invention is to provide a walking bicycle having a platform forming the body of the vehicle, said platform being mounted above both wheels of the device.

A still further object of the invention is to provide a vehicle having a steering fork and a body, said members being hingedly connected together and said fork forming a support for the forward end of the body above the steering wheel upon which the fork is mounted.

Another object of the invention is to provide in a vehicle of the bicycle type, a horizontal frame terminating at its rear end in a 90° curved fork having support on the axle of a rear wheel of the vehicle.

With the above and such other objects in view, as may hereinafter more fully appear, I have invented the device illustrated in the accompanying drawings in which:

Figure 1 is a side elevational view of my device;

Figure 2 is a top plan view thereof;

Figure 3 is a detail perspective view of a frame member.

I am aware of the fact that there are three wheeled vehicles, for the use of very young children, and also bicycles having the seat mounted above the wheels of the vehicle, but which are pedal propelled. I also know of the two wheeled vehicle known to the trade as "scooters" upon which the child stands with one foot and propels himself with the other foot. The two wheeled "walking bicycle" is also known to me, but the construction of all of these and similar devices well known in the art is not such as to provide a pleasure vehicle suitable to the use of children between the coaster kar babyhood age, and the bicycle age of the youth, therefore, my invention has been designed to meet the wants of children between the ages mentioned and, therefore, I have invented the device now to be described.

Like reference characters indicate like parts throughout the following specification, and in the several views in the drawings, in which 1 indicates a vehicle, embracing a front wheel 2, a rear wheel 3, a body member 4, an inclined steering fork 5, terminating at its upper end in handle bars 6, a platform 7, and brace rods 8 and 9. The member 4 consists of a metal strap having a bifurcated rear portion 10, which is carried downwardly at a substantially 135° angle forming a rear fork, the prongs 11 and 12 of which straddle the rear wheel 3, and which terminate in bearings 13 and 14 for the axle 15 of said rear wheel 3. The forward end 16 of the member 4 terminates in an eye 17, hingedly held to the bracket 18, by the pivot pin 19, the bracket 18 being bolted to the fork 5. The platform 7, is of an oval tapering formation and extends from the hinge joint 20, to over the rear wheel 3, and is held fixedly mounted upon the member 4, by means of relatively wide straps 21, straddling the member 4, and bolted to the under side of said platform saddle 7. The braces 8 and 9 are secured at 22 and 23 to the lower ends 24 and 25 of the prongs 11 and 12, and at 26 and 27 to the member 4. Foot rests 28 and 29 are mounted respectively on the prongs 30 and 31 of the fork 5, the terminals of the prongs 30 and 31 having bearings 34 and 35 for the axle 36, of the front wheel 2. The length and taper of the seat 7, is such as to permit of very comfortable adjustment of the child seated thereon, both in order that its legs will swing properly to propel the vehicle to the best advantage, adjust its feet upon the rests 28 and 29 and adjust itself to a proper reach of its arms for control of the handle bars. The car is made relatively long as compared to its height, in order to permit of easy balancing and give a good leg stride between the wheels, thus avoiding the possibility of averting the device as would be likely if the wheels were closely coupled and the leg strokes extended beyond the reach of the wheels. The wheels are provided with cushion tires 37 and 38 to avoid noise and shock.

Having described my invention that which I claim to be new and desire to procure by Letters Patent is:

1. A toy vehicle embracing spaced apart front and back wheels, and a bifurcated frame member by means of which said wheels are connected, said member being horizontal between said wheels, and having its rear portion curved down to form bearings for the axle of the rear wheel, a seat disposed along said horizontal portion of said frame member, said seat being longer than the reach between said wheels.

2. A toy vehicle including spaced apart front and back wheels, and a bifurcated frame member by means of which said wheels are connected, said member being horizontal between said wheels, and having its rear portion curved down to engage the axle of the rear wheel, a seat disposed along the horizontal portion of said frame member, said seat being longer than the reach between said wheels, braces connecting said member between its rear end and central portion.

3. A toy vehicle including spaced apart front and back wheels, and a bifurcated frame member by means of which said wheels are connected, said member being horizontal between said wheels, and having its rear portion curved down to engage the axle of the rear wheel, a seat disposed along the horizontal portion of said frame member, said seat being longer than the reach between said wheels, said seat being mounted above both of said wheels.

4. A toy vehicle embracing spaced apart front and back wheels, and a bifurcated metal strap by means of which said wheels are connected, and a steering post for said front wheel to which said frame member is hingedly connected and foot rests on the fork by means of which the vehicle may be steered through the feet of the rider.

5. A toy vehicle including spaced apart front and back wheels, a bifurcated metal strap by means of which said wheels are connected, a steering post for said front wheel to which said frame member is hingedly connected, and a relatively long tapered seat mounted on said frame member.

6. In a vehicle, spaced apart wheels, a bifurcated strap for connecting said wheels, the main body of said strap being horizontally disposed, said strap being arranged at such a height as to permit the user to straddle the same and engage the ground with his feet, and an elongated tapered seat attached to said strap at spaced points.

7. In a vehicle front and rear wheels, a flat metal strap extending substantially from wheel to wheel and forming a connection therebetween, said strap having a bifurcated rear terminal forming a bearing for the rear wheel, and a flat seat of a greater length, than said flat member and disposed along said flat member and attached thereto.

In testimony whereof I affix my signature.

HARRY F. MONTAGUE.